United States Patent
Song et al.

(10) Patent No.: US 8,997,303 B2
(45) Date of Patent: Apr. 7, 2015

(54) WIPER DEVICE

(75) Inventors: Kyoung-Joon Song, Daegu (KR); Sang-Cheol Lee, Daegu (KR)

(73) Assignee: CAP Corporation, Daegu (KR)

( * ) Notice: Subject to any disclaimer, the term of this patent is extended or adjusted under 35 U.S.C. 154(b) by 722 days.

(21) Appl. No.: 13/099,724

(22) Filed: May 3, 2011

(65) Prior Publication Data

US 2012/0144615 A1    Jun. 14, 2012

(30) Foreign Application Priority Data

Dec. 14, 2010    (KR) ........................ 10-2010-0127437

(51) Int. Cl.
*B60S 1/40* (2006.01)
*B60S 1/38* (2006.01)

(52) U.S. Cl.
CPC ............. *B60S 1/4009* (2013.01); *B60S 1/4003* (2013.01); *B60S 1/4048* (2013.01); *B60S 1/4074* (2013.01); *B60S 1/387* (2013.01); *B60S 1/407* (2013.01); *B60S 2001/4035* (2013.01); *B60S 2001/4051* (2013.01); *B60S 2001/4054* (2013.01)

(58) Field of Classification Search
CPC ........ B60S 1/40; B60S 1/4003; B60S 1/4006; B60S 1/4009; B60S 1/4019; B60S 1/4016; B60S 1/4045; B60S 1/4048; B60S 1/4077
USPC ............. 15/250.32, 250.43, 250.44, 250.201, 15/250.361
See application file for complete search history.

(56) References Cited

U.S. PATENT DOCUMENTS

| | | | | | |
|---|---|---|---|---|---|
| 4,670,934 | A | * | 6/1987 | Epple et al. | 15/250.32 |
| 5,611,103 | A | * | 3/1997 | Lee | 15/250.32 |
| 5,920,950 | A | * | 7/1999 | Young et al. | 15/250.32 |
| 7,421,755 | B2 | * | 9/2008 | Kinoshita et al. | 15/250.32 |
| 2010/0005609 | A1 | * | 1/2010 | Kim | 15/250.32 |
| 2012/0110773 | A1 | * | 5/2012 | Thielen et al. | 15/250.32 |

FOREIGN PATENT DOCUMENTS

| | | |
|---|---|---|
| KR | 100678408 | 2/2007 |
| KR | 100903374 | 6/2009 |
| WO | WO2009/155230 A1 * | 12/2009 |

OTHER PUBLICATIONS

Korean Office Action dated Sep. 25, 2012, received in corresponding priority Application No. 10-2010-0127437, with English language summary attached, 5 pgs.

* cited by examiner

*Primary Examiner* — Gary Graham
(74) *Attorney, Agent, or Firm* — Grossman Tucker Perreault & Pfleger, PLLC

(57) ABSTRACT

Wiper device is disclosed. a wiper device includes a wiper blade tightly contacted to a windshield and configured to wipe a foreign substance and an adaptor connecting the wiper blade to a wiper arm, wherein the adaptor includes a body rotatably connected to the wiper blade about an axle formed in a traverse direction of the wiper blade, and a connector extended in a lengthwise direction of the wiper blade and having one end that is connected to the wiper arm and the other end that is hinge-connected to the body. Since it is possible to adjust the wiper arm and the wiper blade in various angles, the wiper blade can be tightly contacted to the windshield and thus have a superior wiping performance.

8 Claims, 10 Drawing Sheets

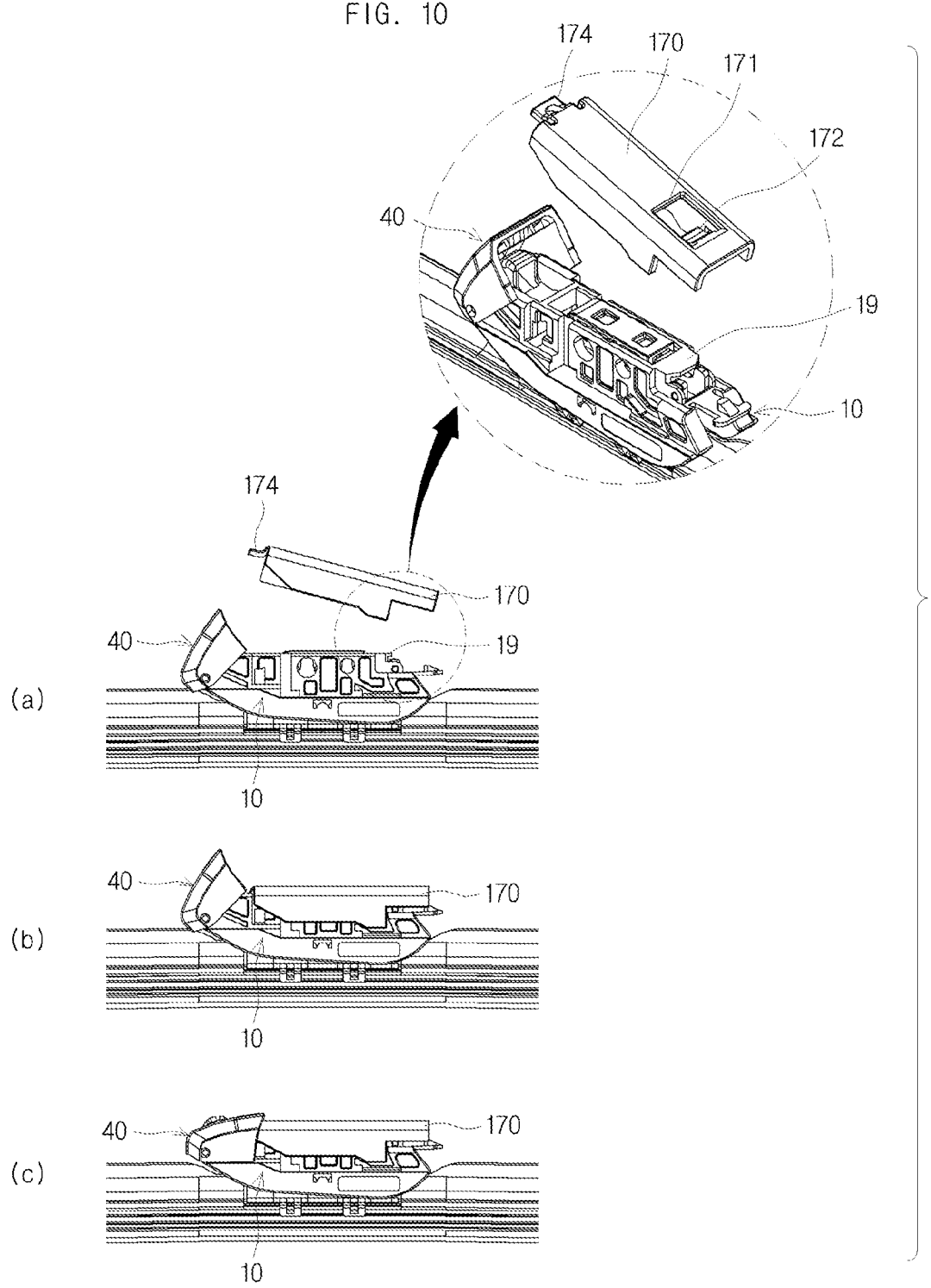

WIPER DEVICE

FIELD OF THE INVENTION

The present invention relates to a wiper device.

BACKGROUND OF THE INVENTION

When a windshield of a vehicle in driving is contaminated by various substances, including dust in the atmosphere or rain or snow, it becomes more difficult to secure a clear view and can affect the safety of driving. Thus, a wiper for clearing snow, rain, or various substances is equipped on the windshield in order to secure the clear view for the safety of a driver.

It is very important for the wiper to be tightly contacted to the curved windshield in order to provide a superior wiping performance.

In addition, since the wiper is a disposable part, it is recommended to be replaced regularly in order to maintain its wiping performance. However, since each car manufacturer designs the specification of wiper differently, each vehicle requires a different shape of wiper. Since the production of various wipers in small quantity is a big burden to a wiper manufacturer, a wiper that can meet various specifications is required.

SUMMARY OF THE INVENTION

The embodiment of the present invention provides a wiper device having a superior wiping performance.

Also the embodiment of the present invention provides a wiper device that can be connected to various types of wiper arm.

According to one aspect of the embodiment, there is provided a wiper device, including a wiper blade tightly contacted to a windshield and configured to wipe a foreign substance and an adaptor connecting the wiper blade to a wiper arm, wherein the adaptor includes a body rotatably connected to the wiper blade about an axle formed in a traverse direction of the wiper blade, and a connector extended in a lengthwise direction of the wiper blade and having one end that is connected to the wiper arm and the other end that is hinge-connected to the body.

The body may include a partition wall extended in a lengthwise direction of the wiper blade and having a via hole formed therein, and wherein the connector comprises a recess formed therein, the recess being connected to a pin that has passed through the via hole of the partition wall.

An inserting groove into which a portion of the wiper arm being connected is inserted is formed in the body.

The body may include an arm locking member securing the wiper arm being connected to the body.

The wiper device may further include a rotational cover hinge-connected for rotating in a vertical direction with respect to the body so as to cover one end of the wiper arm connected to the body.

The body may include a cover locking member securing the rotational cover.

The one end of the connector is formed to be protruded in such a way that a hook-type wiper arm can be inserted into the one end of the connector. And, the wiper device may further include a removable cover covering the body and the hook-type wiper arm so that the hook-type wiper arm inserted into the connector is prevented from being separated. In addition, a via hole corresponding to the via hole formed in the body is formed in the removable cover.

Since the embodiment of the present invention can adjust the wiper arm and the wiper blade in various angles, the wiper blade can be tightly contacted to the windshield and thus have a superior wiping performance.

In addition, since the embodiment of the present invention can be connected to various types of wiper arms by use of adaptor, it is possible to be equipped on various vehicles.

BRIEF DESCRIPTION OF ACCOMPANYING DRAWINGS

FIGS. 4 through 10 show various types of wiper arms coupled to the wiper device according to one embodiment of the present invention.

DETAILED DESCRIPTION OF THE INVENTION

Hereinafter, the embodiment of the present invention will be described in detail with reference to the accompanying drawings.

Figure 1:
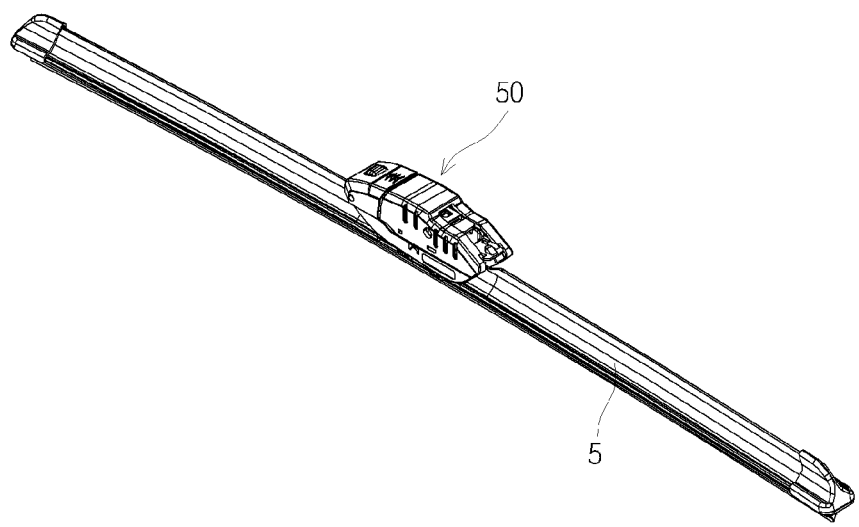
FIG. 1 is a perspective view of the wiper device according to one embodiment of the present invention.
Figure 2:
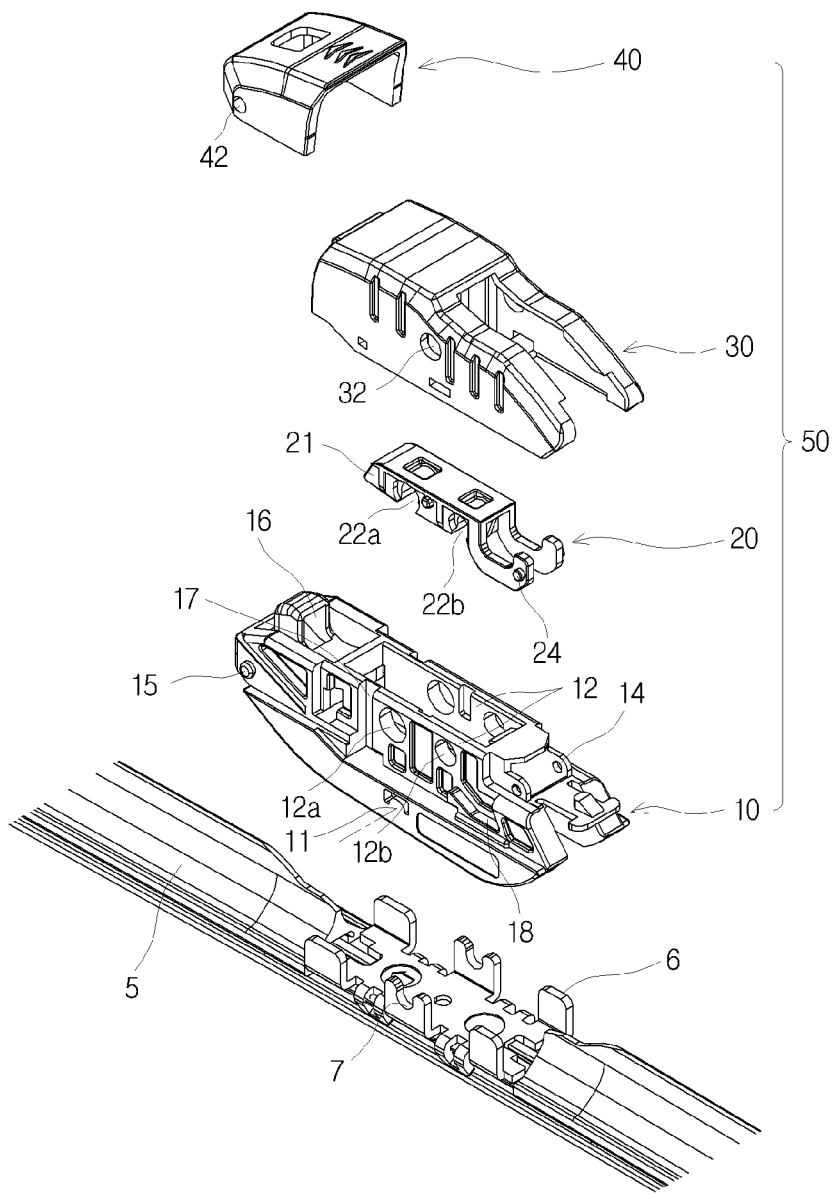
FIG. 2 is an exploded perspective view of the wiper device according to one embodiment of the present invention.
Figure 3:
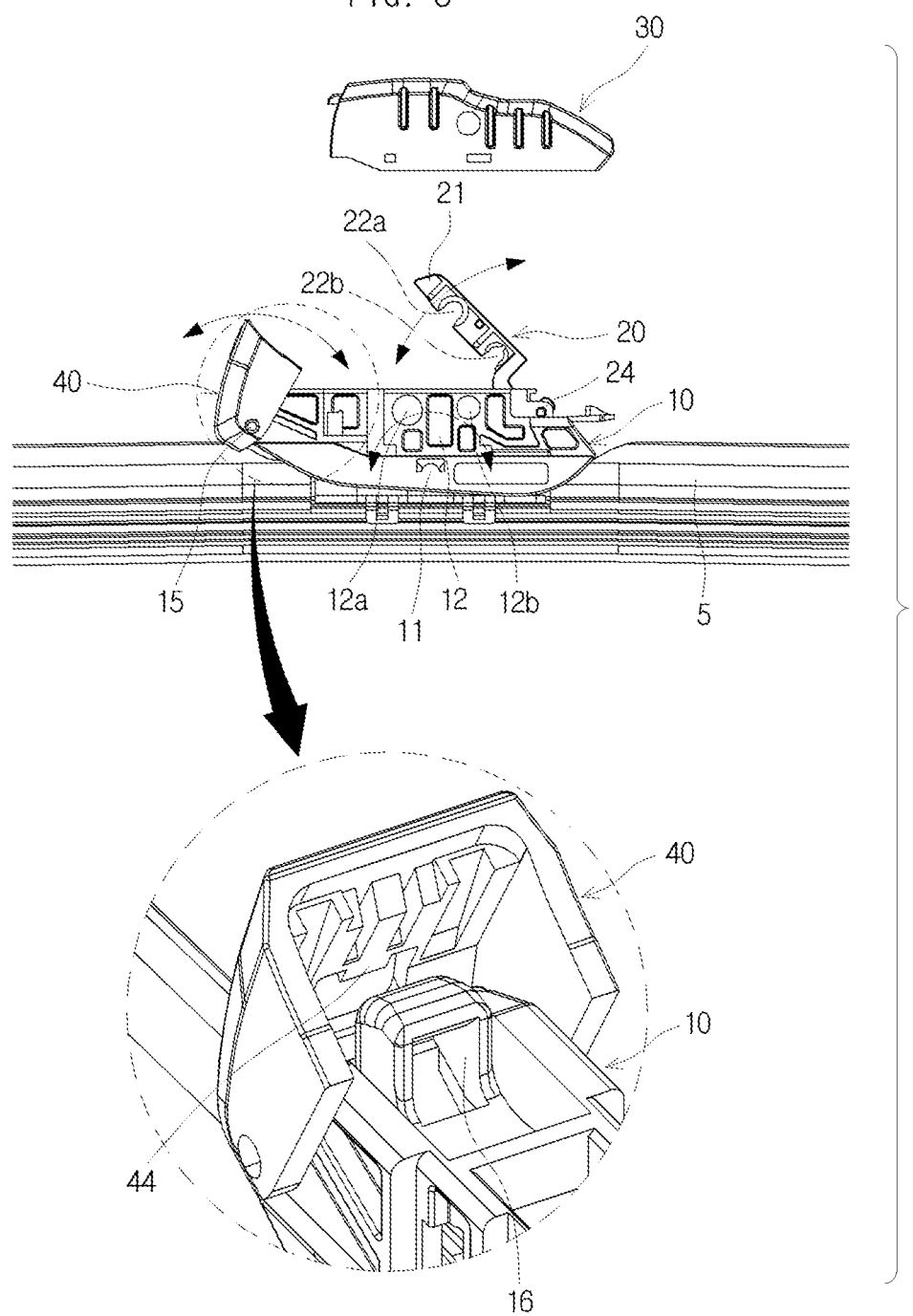
FIG. 3 shows operation of an adaptor of the wiper device according to one embodiment of the present invention.

FIG. 1 is a perspective view of the wiper device according to one embodiment of the present invention, and FIG. 2 is an exploded perspective view of the wiper device according to one embodiment of the present invention. FIG. 3 shows operation of an adaptor of the wiper device according to one embodiment of the present invention.

The wiper device according to one embodiment of the present invention includes a wiper blade 5 and an adaptor 50 for connecting the wiper blade 5 to various types of wiper arms.

The wiper blade 5, which is tightly contacted to a windshield, is for cleaning various substances and includes a variety of known wiper blades.

As shown in FIG. 1, the wiper blade is constituted with a contact member, which is made of rubber, for being tightly contacted to the windshield and a body spring for elastically supporting the contact member to be tightly contacted to the windshield.

In addition, as shown in FIG. 2, as the wiper blade 5 encompasses a clamp 6 on which an axle support 7 for rotatably supporting the adaptor 50 is formed, the adaptor 50 can be rotated by a certain angle required for operation relative to the wiper blade 5.

The adaptor 50 connects the wiper blade 5 to a wiper arm, and comprises a body 10 and a removable cover 30 so as to be connected to a side pin-type wiper arm. The body 10 is rotatably connected to the wiper blade 5, and comprises a partition wall 12 extended in a lengthwise direction of the wiper blade 5 and has a via hole 12a, 12b formed therein. The removable cover 30 covers the body 10, wherein a via hole corresponding to the via hole formed in the body is formed therein. When the wiper device of the present embodiment comprising the body 10 and the removable cover 30 is secured to the side pin-type wiper arm 120, 130, they can be connected by inserting the connecting pin to the via holes 12a, 12b of the partition wall 12 of the body 10 and the via hole in the removable cover corresponding to the via hole formed in the body. In another embodiment, an adaptor 50 further comprises a connector 20 such that the wiper device can be connected both the side pin-type wiper arm 120, 130 and a hook-type wiper arm. The connector 20 can connect the wiper arm to the body with a hinge structure. Thus, as the wiper arm is connected to the wiper blade 5 with two joints, the wiper blade 5 can be tightly contacted to the windshield by adjusting the angle between the wiper arm and the wiper blade 5 variously.

As shown in FIGS. 2 and 3, the body 10 of the present embodiment has an axle 11 being formed in a traverse direction of the wiper blade 5 (that is, in a direction crossing the wiper blade 5 from a side). The axle 11 is supported by an axle support 7 of the clamp 6 so that the body 10 can rotate about the axle 11.

Also, in one embodiment, the connector 20 is formed to be extended in a lengthwise direction of the wiper blade 5, and in order for one end 21, which is connected to the wiper arm, to be rotatable in its vertical directions relative to the body 10, the other end of the connector 20 is hinge-connected to the body 10. Specifically, by inserting a hinge protrusion 24 formed on the other end of the connector 20 into a hinge groove 14 formed on the body 10, they can be connected in the hinge structure.

Here, in order for the one end 21 of the connector 20 of the present embodiment to be connected to a hook-type wiper arm, the one end 21 of the connector 20 can be formed to be protruded. Specifically, the one end 21 of the protruded connector 20 is formed in the shape corresponding to that of a hook of the hook-type wiper arm. Accordingly, by securing the one end 21 of the connector 20 to the hook, the hook-type wiper arm and the connector 20 can be connected to each other.

As described above, since the connector 20 of the present embodiment is connected to the body in the hinge structure, when connecting the connector 20 to the hook-type wiper arm, one end 21 of the connector 20 is lifted vertically upward to the body (namely, pulling the one end 21 of the connector 20 from the behind of the partition wall 12) to be secured to the hook with ease.

In addition, the adaptor 50 of the present embodiment can be connected to a side pin-type wiper arm.

Particularly, in the present embodiment, the body 10 includes a partition wall 12 that is connected to the wiper blade 5, is extended in the lengthwise direction of the wiper blade 5, and has via holes 12a, 12b formed therein. Moreover, recesses 22a, 22b to be connected to connecting pins that have passed through via holes 12a, 12b of the partition wall 12 are formed on the connector 20.

Accordingly, when the connecting pins of the side pin-type wiper arm are inserted into the via holes 12a, 12b, the recesses 22a, 22b of the connector 20 hold the connecting pins to allow the side pin-type wiper arm and the adaptor 50 to be connected.

As shown in FIG. 2, the body 10 of the present embodiment is connected to the clamp 6 of the wiper blade 5, and a pair of partition walls 12 that are facing each other are formed in the lengthwise direction of the wiper blade 5 in the body 10. And, two via holes 12a, 12b are formed in each partition wall 12 so that two types of connecting pins can be inserted.

Also, between the pair of partition walls 12, two recesses 22a, 22b corresponding to the two via holes 12a, 12b are formed, and a connector 20 with one end taking a form of being protruded is arranged.

Also, in the present embodiment, as recesses 22a, 22b of the connector 20 are opened in the downward direction, namely, opened toward the wiper blade 5, when inserting the connecting pin into the via holes 12a, 12b and rotating the connector 20 in the downward direction, it becomes easy to couple the connecting pin to the recesses 22a, 22b.

FIGS. 4 through 10 illustrate connection between a variety of wiper arms and the wiper device according to the one embodiment.

Figure 4:
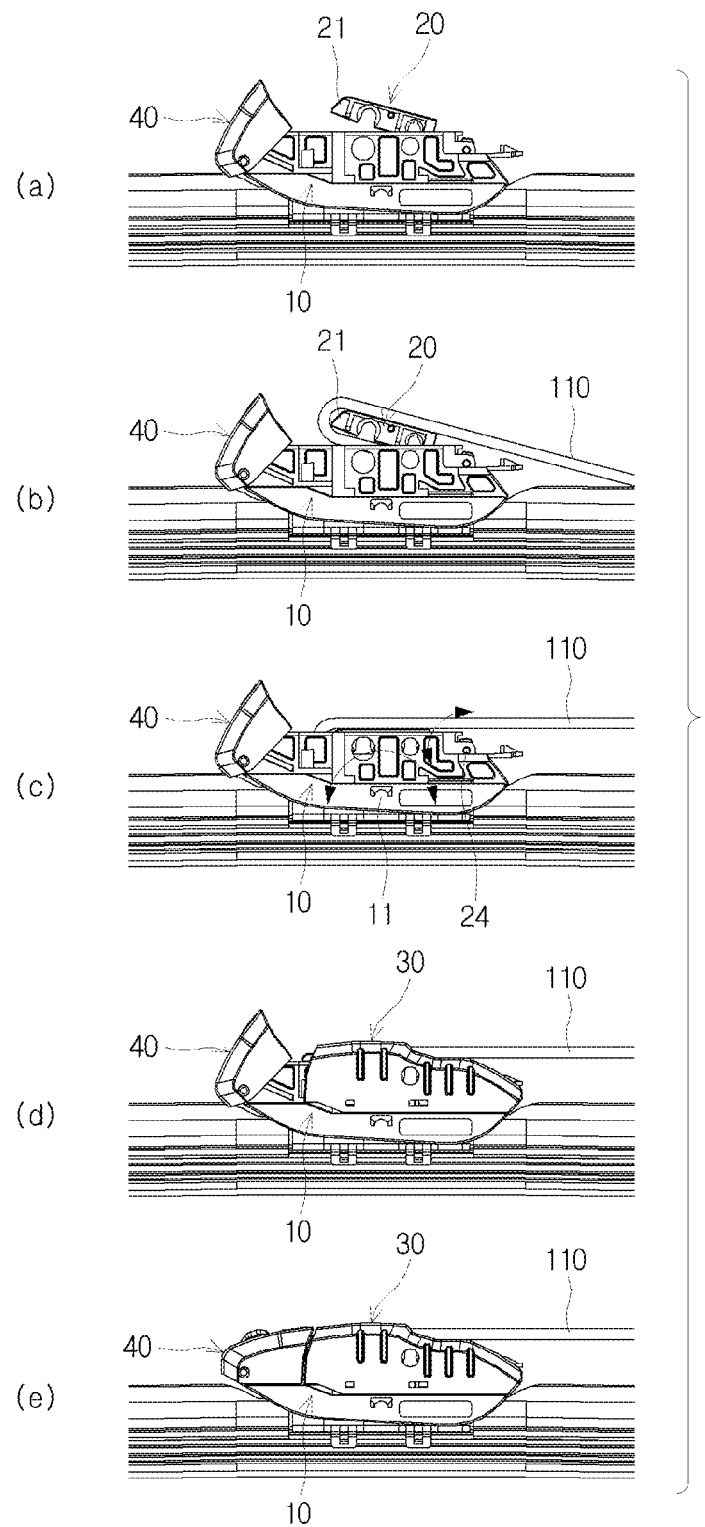

As shown in FIG. 4, when securing the wiper device of the present embodiment comprising the body 10, the connector 20, and the removable cover 30 to the hook-type wiper arm 110, one end 21 of the connector 20 to be connected to the hook is lifted in an upward direction of the body 10 to take the one end 21 of the connector 20 out of the body 10 and then connect the hook. Then the connector 20 that is connected to the hook is lowered in a downward direction of the body 10, and the one end 21 of the connector 20 is reinserted into the body 10.

The removable cover 30 can cover the body 10 and the hook-type wiper arm 110 together in order to prevent the hook type wiper arm 110 from being released from the adaptor 50. Accordingly, the hook-type wiper arm 110 can be prevented from being separated by the hook that is inserted into the body 10 coming out to the outer side of the body 10.

Figure 5:
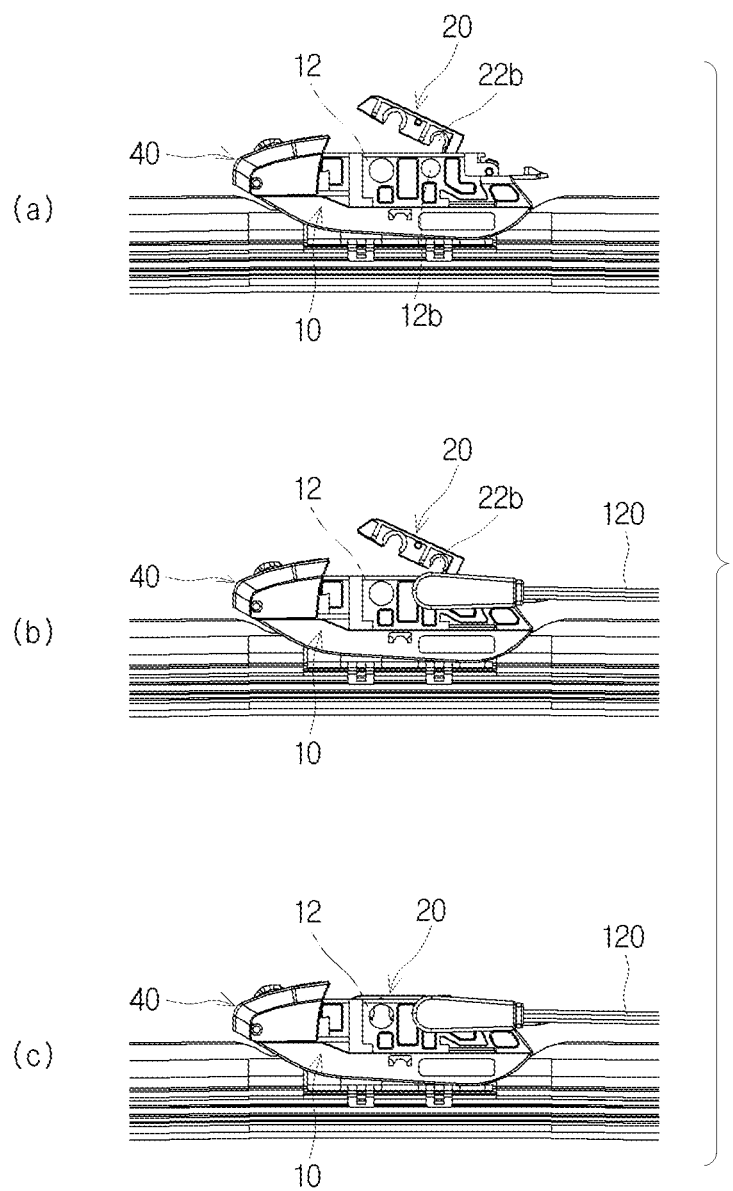
Figure 6:
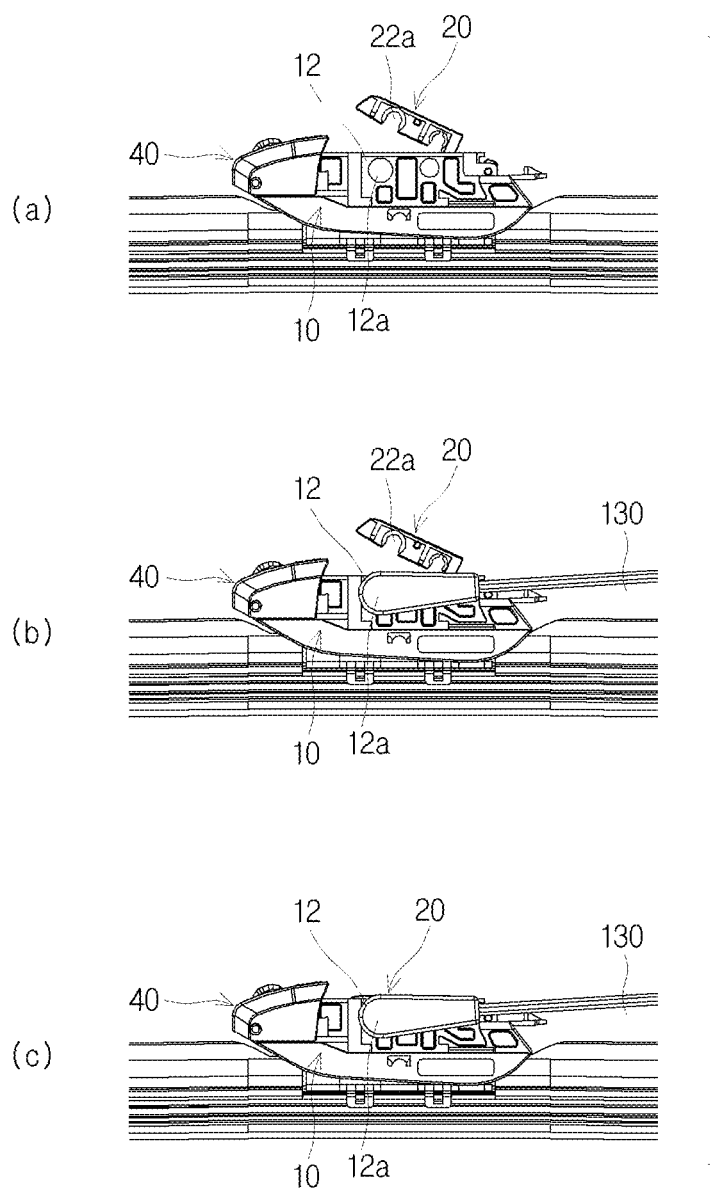

In addition, as shown in FIGS. 5 and 6, when the wiper device of the present embodiment is secured to the side pin-type wiper arm 120, 130, the recesses 22a, 22b of the connector 20 are secured to the connecting pin after inserting the connecting pin to the via holes 12a, 12b of the partition wall 12 of the body 10. Particularly, as the pair of recesses 22a, 22b that are connected respectively to two connecting pins having different diameters are formed on the connector 20, the adaptor 50 of the present embodiment can be connected to two kinds of side pin-type wiper arms 120, 130.

Figure 7:
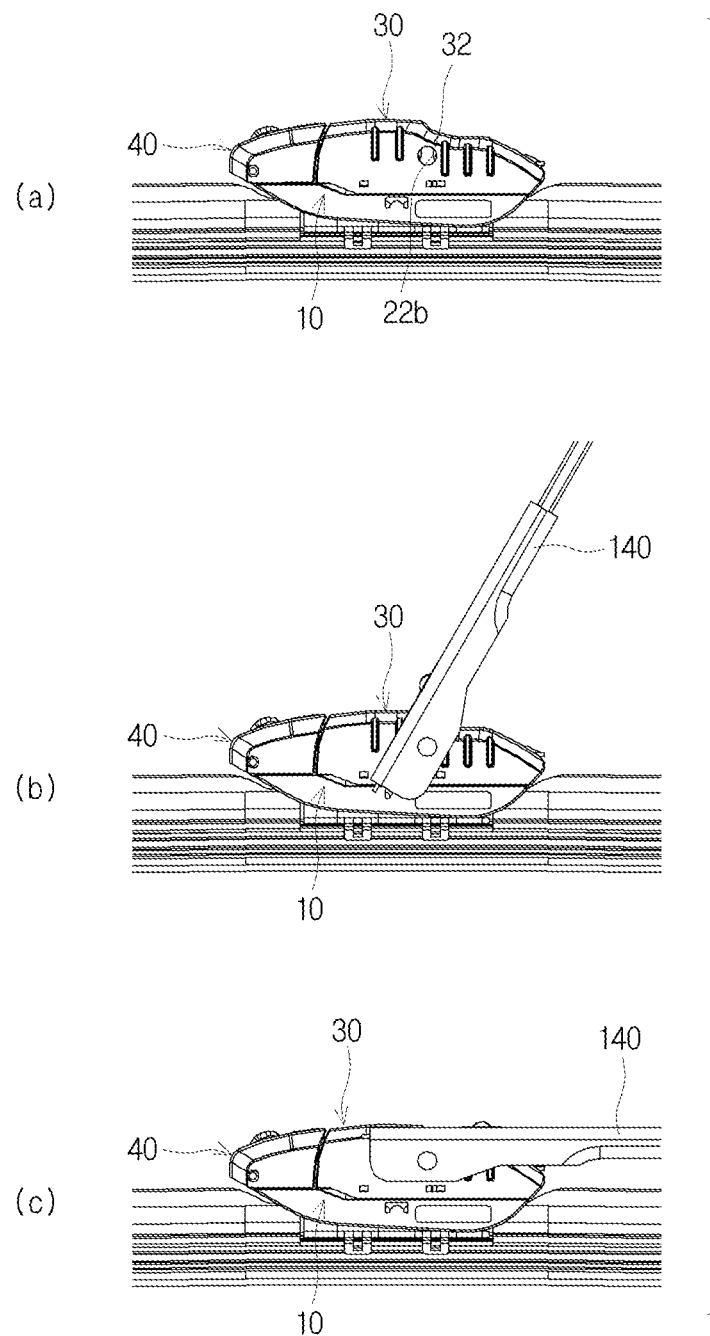

Also, as shown in FIG. 7, by using the removable cover 30, it is also possible to connect to another kind of side pin-type wiper arm 140. Specifically, a via hole 32 corresponding to the via hole 12b of the body 10 can be formed in the removable cover 30. Accordingly, it becomes possible to connect to a side pin-type wiper arm 140 having a connecting pin that is longer than the connecting pin inserted directly into the via holes 12a, 12b on the partition wall 12 of the body 10. Namely, by adjusting a thickness of the adaptor 50, it becomes possible to connect to the connecting pin having various lengths.

In addition, the adaptor 50 of the present embodiment can be connected to a wiper arm having a fitting structure and a locking structure. For this, inserting grooves 17, 18, into which a portion of the wiper arm having the fitting structure is inserted, or an arm locking member, which secures the wiper arm, can be formed on the body 10 of the adaptor 50.

Figure 8:
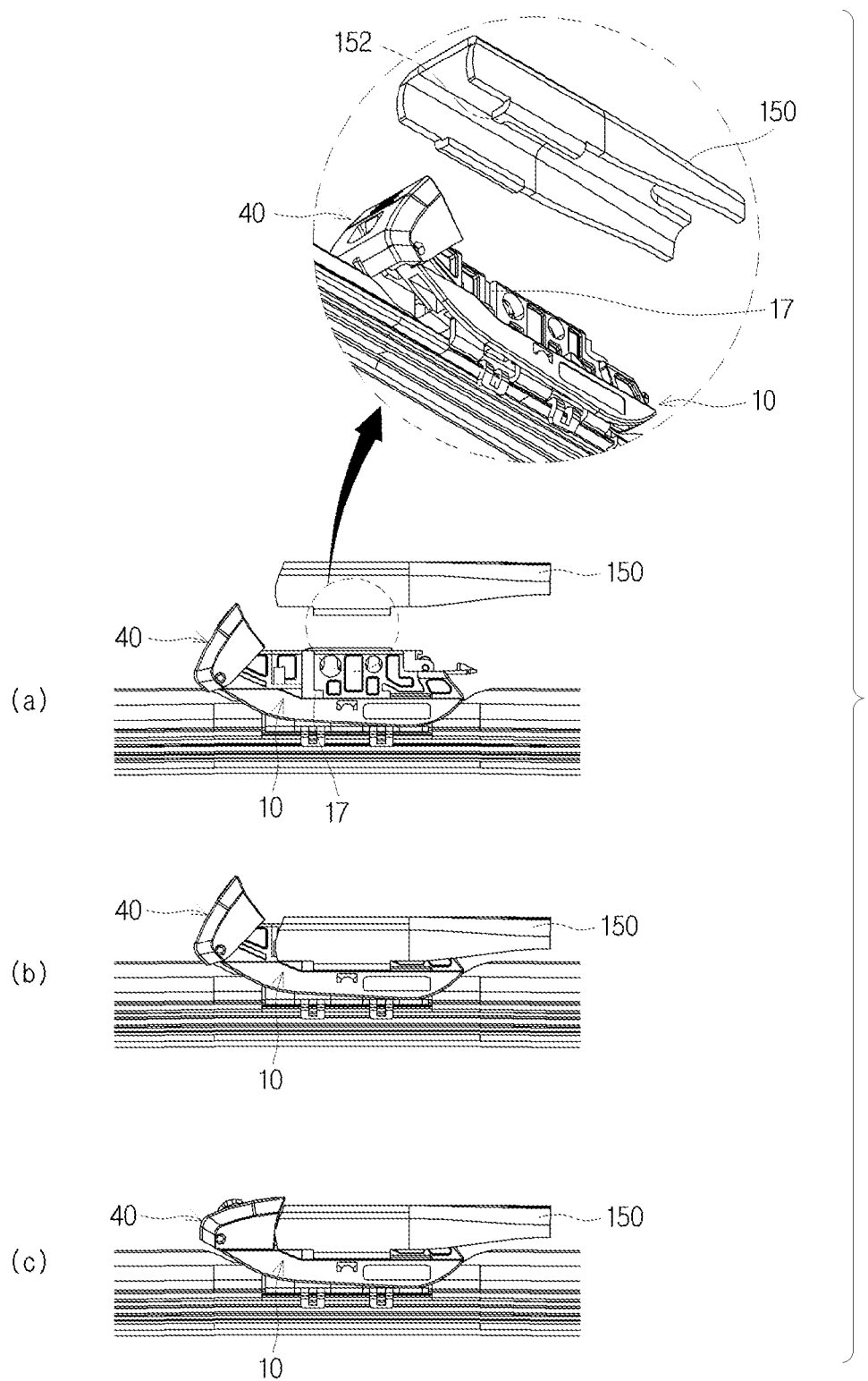
Figure 9:
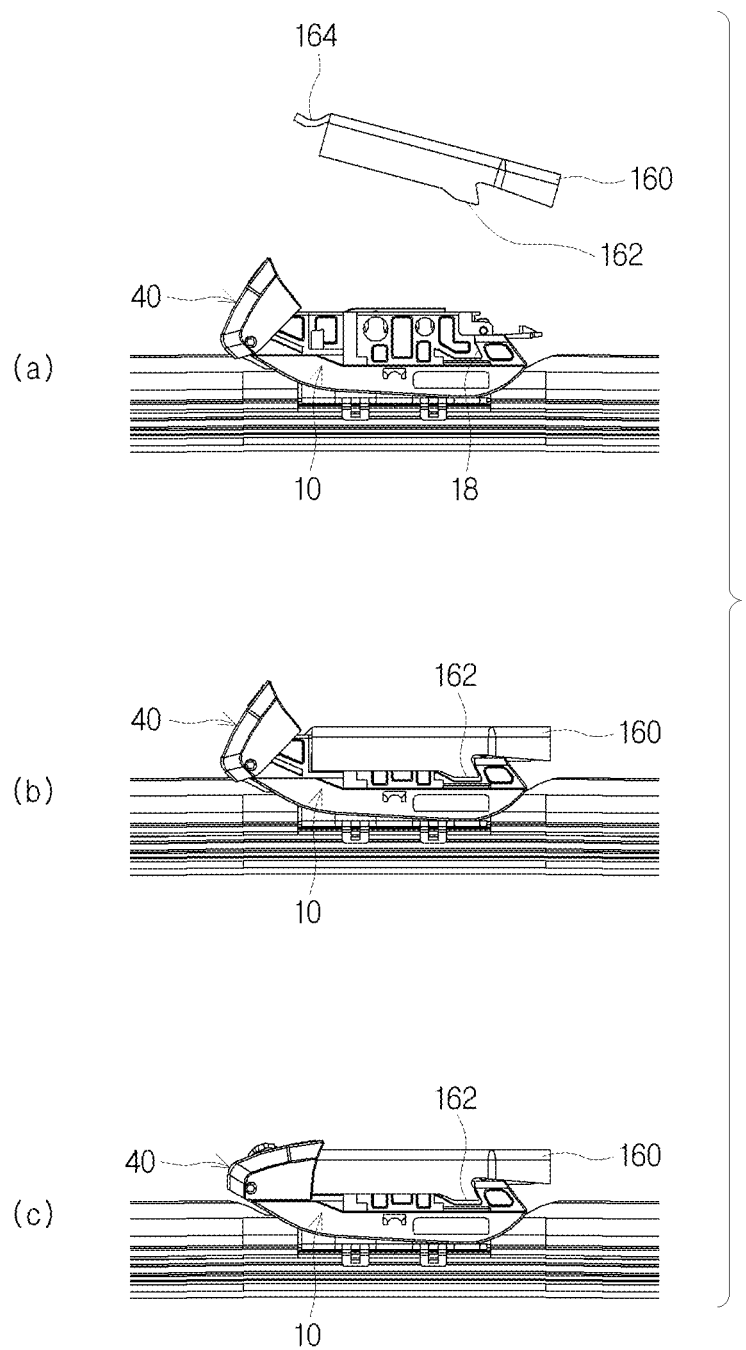

As shown in FIGS. 8 and 9, the inserting grooves 17, 18, which correspond to protrusions 152, 162 of the wiper arm 150, 160 having the fitting structure, are formed in the body 10 of the present embodiment. Accordingly, it becomes possible to insert the protrusions 152, 162 into the inserting grooves 17, 18 of the body 10 to connect the body 10 to the wiper arm 150, 160.

In addition, as shown in FIG. 10, an arm locking member 19, which corresponds to the locking structure of the wiper arm 170, is also formed on the body 10 of the present embodiment. Specifically, the arm locking member 19, which is interlocked with the locking member 172 that is formed on the inner side of the opening 171 of the wiper arm 170, is formed to be protruded on the body 10. Accordingly, the body 10 and the wiper arm 170 can be connected to each other by locking the locking member 172 of the wiper arm 170 to the arm locking member 19 of the body 10.

Here, for much firmer connection of the body 10 to the connected wiper arm, the adaptor 50 can additionally include a rotational cover 40, which covers an end potion of the connected wiper arm.

As shown in FIGS. 9 and 10, the adaptor 50 of the present embodiment includes the rotational cover 40 that is hinge-connected for rotating vertically with respect to the body 10.

Specifically, as shown in FIGS. 2 and 3, a hinge protrusion 15 of the body 10 is inserted into the hinge groove 42 of the rotational cover 40 to be connected in the form of a hinge structure. And as shown in FIGS. 9 and 10, when the rotational cover 40 moves in the downward direction to cover the body 10, end portions 164, 174 of the wiper arm 160, 170 are interposed between the body 10 and the rotational cover 40. Accordingly, the end portions 164, 174 of the wiper arm 160, 170 are additionally connected to the adaptor 50.

Here, when the rotational cover 40 covers the body 10 and the wiper arm 160, 170, a cover locking member 16, which secures the rotational cover 40, can be formed on the body 10 so as to secure a location of the rotational cover 40.

As shown in FIG. 3, the cover locking member 16 in the form of a groove shape, into which the protrusion member 44 of the rotational cover 40 is inserted and secured, is formed on the body 10.

As described above, the wiper device of the present embodiment can be installed in a variety of vehicles having different types of wiper arms, by being equipped with the adaptor that can be connected with various types of wiper arms.

Although a certain embodiment of the present invention has been described above, it shall be appreciated that there can be a variety of permutations and modifications of the present invention by those who are ordinarily skilled in the art to which the present invention pertains without departing from the technical ideas and scope of the present invention, which shall be defined by the appended claims.

It shall be also appreciated that many embodiments other than the embodiment described above are present in the claims of the present invention.

What is claimed is:

1. A wiper device comprising a wiper blade and an adaptor, the wiper blade tightly contacted to a windshield and configured to wipe off a foreign substance, the adaptor connecting the wiper blade to a wiper arm, the adaptor comprising:
   a body rotatably connected to the wiper blade and comprising a partition wall extended in a lengthwise direction of the wiper blade and having a via hole formed therein;
   a removable cover covering the body and having a via hole formed therein, the via hole of the removable cover corresponding to the via hole formed in the partition wall; and
   a rotational cover hinge-connected for rotating in a vertical direction with respect to the body so as to cover one end of the wiper arm connected to the body.

2. The wiper device of claim 1, further comprising a connector having a recess formed therein, the recess being connected to a pin that has passed through the via hole of the partition wall, wherein one end of the connector is formed to be protruded in a lengthwise direction of the wiper blade in such a way that a hook-type wiper arm can be inserted into the one end of the connector.

3. The wiper device of claim 2, wherein the other end of the connector is hinge-coupled to the body in such a way that the one end of the connector is rotatable upward and downward with respect to the body.

4. The wiper device of claim 1, wherein the body comprises an arm locking member securing the wiper arm being connected to the body.

5. The wiper device of claim 1, wherein the body has an inserting groove formed therein, a portion of the wiper arm being connected is inserted into the inserting groove.

6. The wiper device of claim 1, wherein the body comprises a cover locking member securing the rotational cover.

7. A wiper device comprising a wiper blade and an adaptor, the wiper blade tightly contacted to a windshield and configured to wipe off a foreign substance, the adaptor connecting the wiper blade to a wiper arm, the adaptor comprising:
   a body rotatably connected to the wiper blade and comprising a partition wall extended in a lengthwise direction of the wiper blade and having a via hole formed therein;
   a removable cover covering the body and having a via hole formed therein, the via hole of the removable cover corresponding to the via hole formed in the partition wall; and
   a connector having a recess formed therein, the recess being connected to a pin that has passed through the via hole of the partition wall, wherein one end of the connector is formed to be protruded in a lengthwise direction of the wiper blade in such a way that a hook-type wiper arm can be inserted into the one end of the connector.

8. The wiper device of claim 7, wherein the other end of the connector is hinge-coupled to the body in such a way that the one end of the connector is rotatable upward and downward with respect to the body.

* * * * *